United States Patent
Klocke

(10) Patent No.: US 9,220,236 B2
(45) Date of Patent: Dec. 29, 2015

(54) SOW GESTATION TUBE FEEDER

(71) Applicant: Dave Klocke, Templeton, IA (US)

(72) Inventor: Dave Klocke, Templeton, IA (US)

( * ) Notice: Subject to any disclaimer, the term of this patent is extended or adjusted under 35 U.S.C. 154(b) by 268 days.

(21) Appl. No.: 13/847,626

(22) Filed: Mar. 20, 2013

(65) Prior Publication Data
US 2014/0283756 A1    Sep. 25, 2014

(51) Int. Cl.
*A01K 5/00* (2006.01)
*A01K 5/02* (2006.01)

(52) U.S. Cl.
CPC ............. *A01K 5/0233* (2013.01); *A01K 5/0241* (2013.01)

(58) Field of Classification Search
CPC .. A01K 5/0225; A01K 5/0233; A01K 5/0241
USPC .......................... 119/53.5, 54, 51.03, 71, 52.1
See application file for complete search history.

(56) References Cited

U.S. PATENT DOCUMENTS

| | | | |
|---|---|---|---|
| 1,346,784 A | | 7/1920 | Hamilton |
| 2,207,395 A | * | 7/1940 | Brown ........................... 222/248 |
| 2,723,783 A | * | 11/1955 | Ervin ............................. 222/248 |
| 4,270,489 A | * | 6/1981 | Joronen ....................... 119/51.04 |
| 4,353,329 A | | 10/1982 | Thibault |
| 4,582,023 A | | 4/1986 | Zumbahlen et al. |
| 5,275,130 A | * | 1/1994 | Muckler ........................ 119/53.5 |
| 5,579,719 A | | 12/1996 | Hoff et al. |
| 5,911,195 A | | 6/1999 | Tripp et al. |

FOREIGN PATENT DOCUMENTS

| | | | | |
|---|---|---|---|---|
| FR | 2563078 A1 | * | 10/1985 | ............... A01K 5/02 |
| JP | 04228017 A | * | 8/1992 | ............... A01K 5/00 |
| JP | 2004180543 A | * | 7/2004 | ............... A01K 5/00 |

OTHER PUBLICATIONS

FR 2563078 machine translation.*

* cited by examiner

*Primary Examiner* — Son T Nguyen
(74) *Attorney, Agent, or Firm* — McKee, Voorhees & Sease, PLC

(57) ABSTRACT

A plug insert matingly fits into the open lower end of a feed tube in a gilt or sow stall. The plug includes an inlet for receiving feed from the tube and an outlet for discharging feed onto the floor of the stall. The inlet and outlet are offset from one another. An axle extends through the plug, with spokes on the lower outer end of the axle, an anti-bridge bar on the upper end of the axle, and one or more fins on the central portion of the axle. Discharge of the seed is controlled by the gilt or sow as she rotates the spokes on the forward end of the plug, thereby rotating the fins or spiral flighting to carry feed from the inlet to the outlet. This self-feeding system eliminates or minimizes feed waste while providing an appropriate feeding program for the gilt or sow.

9 Claims, 5 Drawing Sheets

SOW GESTATION TUBE FEEDER

BACKGROUND OF THE INVENTION

In the hog industry, it is common practice to move gilts and sows to a separate gestation building with individual stalls for each sow. It is well-known that the feeding program for breeding pigs has a major impact on performance, including farrowing rate, litter size, piglet weaning weight, and sow health. Productive sows that have increased litter size and heavier piglets require more energy from feed, particularly with their lower body fat levels and the accompanying reduced energy reserves. If feeding is inadequate, the sows muscle tissue and overall health can be adversely affected. Thus, the sow feeding programs need to meet the nutritional requirements at all stages of their lifetime reproductive cycles. Sow longevity is increased when the feeding program provides body growth and maintenance, while achieving high birth rates and weaning weights.

During gestation, feed is used to maintain and grow sow muscle tissue, replenish sow fat reserves lost during previous lactations, and growth of the fetal pigs. The gestation diets are designed to maximize the number of pigs per litter and optimize the piglet birth weight. The gestation diets also can minimize the wean-to-conception period, maximize sow feed intake during lactation, and optimize sow longevity and lifetime productivity. when properly fed, a sow will grow larger as she ages, but without getting too fat or too thin. Overweight sows create numerous problems, including higher feed costs due to more food consumption, smaller and less vigorous litters, reduced mobility, reduced milk production, and accidental crushing of piglets. Similarly, underweight sows also lose muscle tissue resulting in premature culling, and other health issues. The feed diets vary from gilt development to gestation to lactation to farrowing. While all of these feeding stages are important, the present invention is particularly directed towards efficient feeding strategies for gestating sows as an important management practice needed for optimum production of offspring, as well as maintaining the health and longevity of the sows.

The amount of feed supplied during specific phases of gestation can positively or negatively affect sow performance. Proper nutritional management of gestating sows includes feeding the correct nutrient levels to meet the sow's requirement during the different gestation phases. Failure to meet the nutritional needs of the sow may result in smaller litters, reduced piglet birth weight and vigor, lower milk production, an increase in the weaning to service interval, a reduction in conception rates, and a shortened reproductive lifespan. Modern sows, with a lean genotype and superior reproductive performance, have different management needs from their counterparts from a generation or two ago.

During gestation, the feeding program should allow the sows to regain any condition or body weight lost during lactation, and reaches her proper condition for subsequent farrowing. The feeding program should also avoid overfeeding, which causes gilts in gestation to have reduced feed intake during lactation, thus, loss of body condition, and extended time from wean to estrous, as well as lower second litter size.

Gilts are often fed ad lib from the time of selection until needed for first breeding. However, when the gilt is brought into the gestation barn, the change in the feeding system from community self-feeding to isolated gravity drop feeders is not always an easy transition for the gilt. The use of gestation stalls, with individual daily feeding, provides the greatest control over the feed intake of the sow, and is the most common method used by producers in the industry. The gestation stalls allow each gilt and sow to be fed to condition, resulting in reduction in feed cost and improved breeding performance.

While ad libitum feeding with self-feeders is known in the swine industry, such feeding has not been utilized in individual stall applications, particularly during gestation. In the United States, the most common feeding equipment in gestation barns is a separate hopper and gravity drop feed tube for each gestation stall. The hoppers are periodically filled with feed, which then falls to the stall floor where the sow can consume the feed, if she is hungry. Otherwise, residual feed is periodically washed from the trough. Thus, if the sow does not eat the feed when it is dropped from the tube, the feed is wasted, and can lead to clogging of the trough drainage system.

Accordingly, a primary objective of the present invention is a self-feeding device for sows and gilts in a gestation stall to maximize feeding strategy and management during gestation.

Another objective of the present invention is the provision of a device for converting a gravity drop feeder in a sow gestation pen to an ad lib feeder so as to maximize litter size and live births, piglet growth, weaning weight, and sow health and longevity.

A further objective of the present invention is a retrofit method of converting a conventional gestation stall drop feeder to a self-feeder for ad lib consumption by the sow.

Yet another objective of the present invention is the provision of a feed control plug or valve which can be quickly and easily installed in the open lower end of a feed drop tube in a swine stall.

Still another objective of the present invention is the provision of a self-feeding device for retrofit installation into a feed drop tube which is virtually maintenance free.

Another objective of the present invention is the provision of a self-feeding device in a gestation stall which is easy for the sow to learn and to actuate.

A further objective of the present invention is the provision of a retrofit self-feeding device for a gestation stall feeding system which is economical to manufacture, and durable and safe in use.

These and other objectives will become apparent from the following description of the invention.

SUMMARY OF THE INVENTION

A device is provided for changing a gravity drop feeder to a self-feeder with ad lib actuator by the animal. The device is ideally suited for a gestation stall for use by a gilt or sow. The device includes a plug inserted into the open lower end of the feed drop tube so as to be matingly received therein. The plug normally closes the lower end of the tube to prevent discharge of feed. The plug has an upper end with a feed inlet and a lower end with a feed outlet. The inlet and outlet are radially spaced or offset from one another. An axle extends longitudinally through the plug, and includes a plurality of fins or baffles to transport feed from the plug inlet to the outlet for discharge onto the stall floor or into a trough or other container. The lower end of the axle has a plurality of spokes residing outside the lower end of the feed tube. The spokes can be nudged by a sow and thereby rotate the axle and fins so as to discharge feed on demand. The inner end of the axle includes an agitator bar to break up clogs or bridging of feed within the tube adjacent the inlet of the plug. The plug is fixed to the tube with a set screw or other convenient means.

DETAILED DESCRIPTION OF THE PREFERRED EMBODIMENTS

Figure 1:
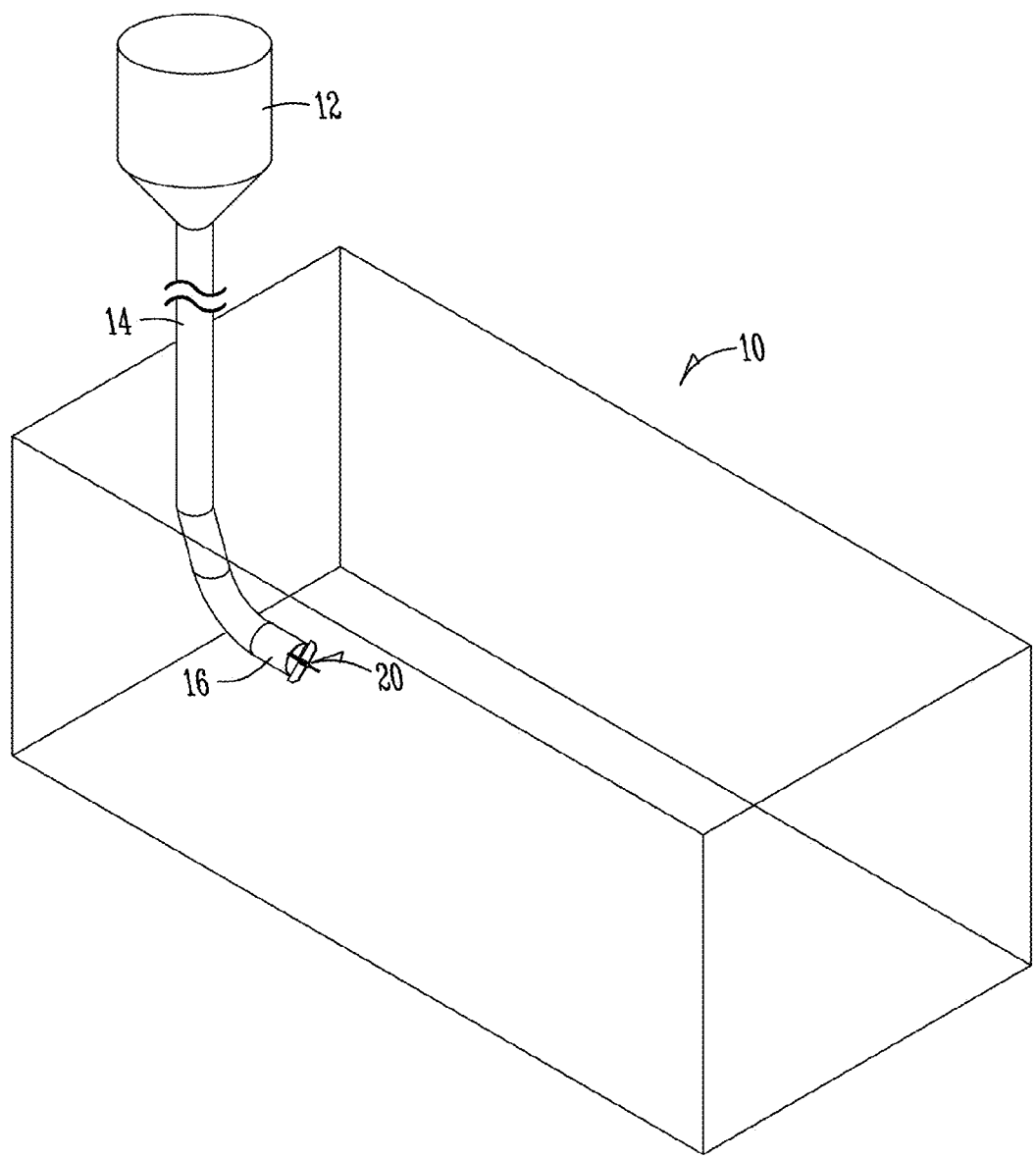
FIG. 1 is a schematic sketch of a gestation stall having a conventional feed hopper and drop tube, with the insert plug of the present invention in the lower end of the tube.
Figure 2:
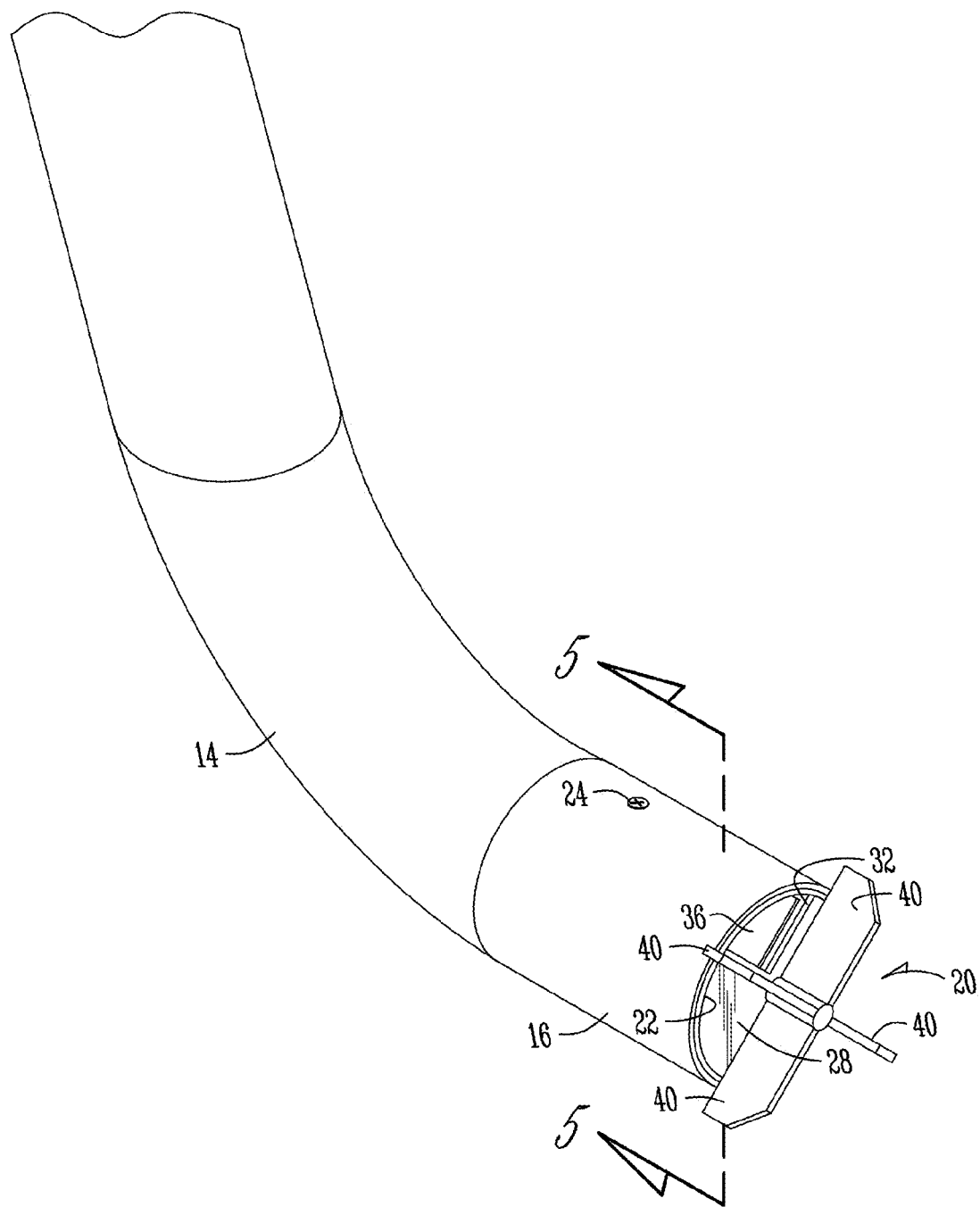
FIG. 2 is an enlarged view of the lower end of the drop tube with the plug according to the present invention.
Figures 3A, 3B:
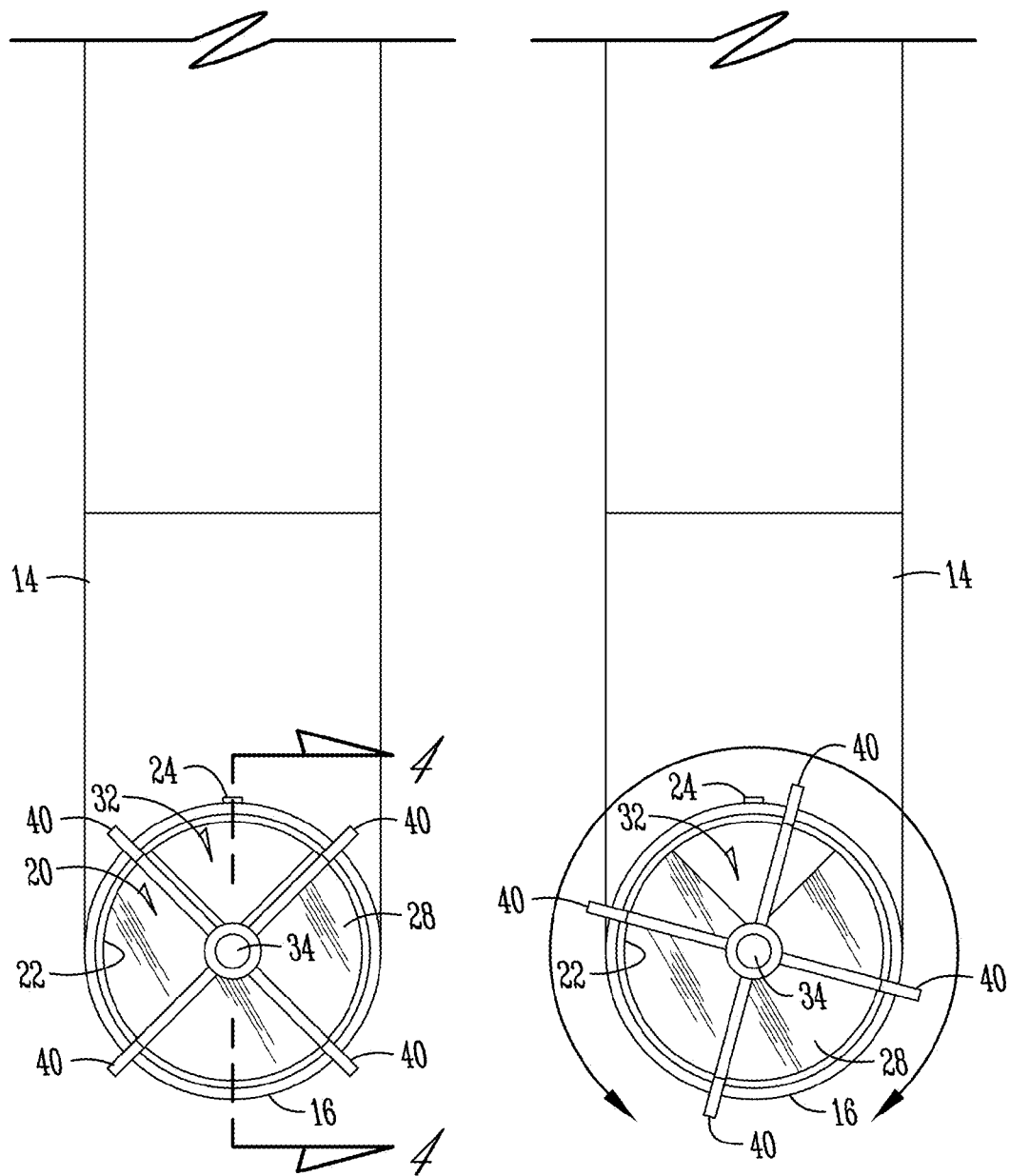
FIG. 3A is an end view of the tube and plug with the spokes in a first position.
FIG. 3B is a view similar to FIG. 3A with the spokes in a second rotated position.

A conventional sow gestation stall is schematically shown in FIG. 1 and designated by the reference numeral 10. The stall 10 is one of many placed side-by-side in a gestation barn. A feeding system in the barn provides feed for each stall 10. More particularly, the feeding system for each stall 10 includes a hopper 12 with a gravity drop tube 14 having a lower end 16 adjacent the floor of the stall 10. The hopper 12 can be loaded in a known manner, such as by an auger system or manual filling, so that feed fills the tube 14.

Figure 4:
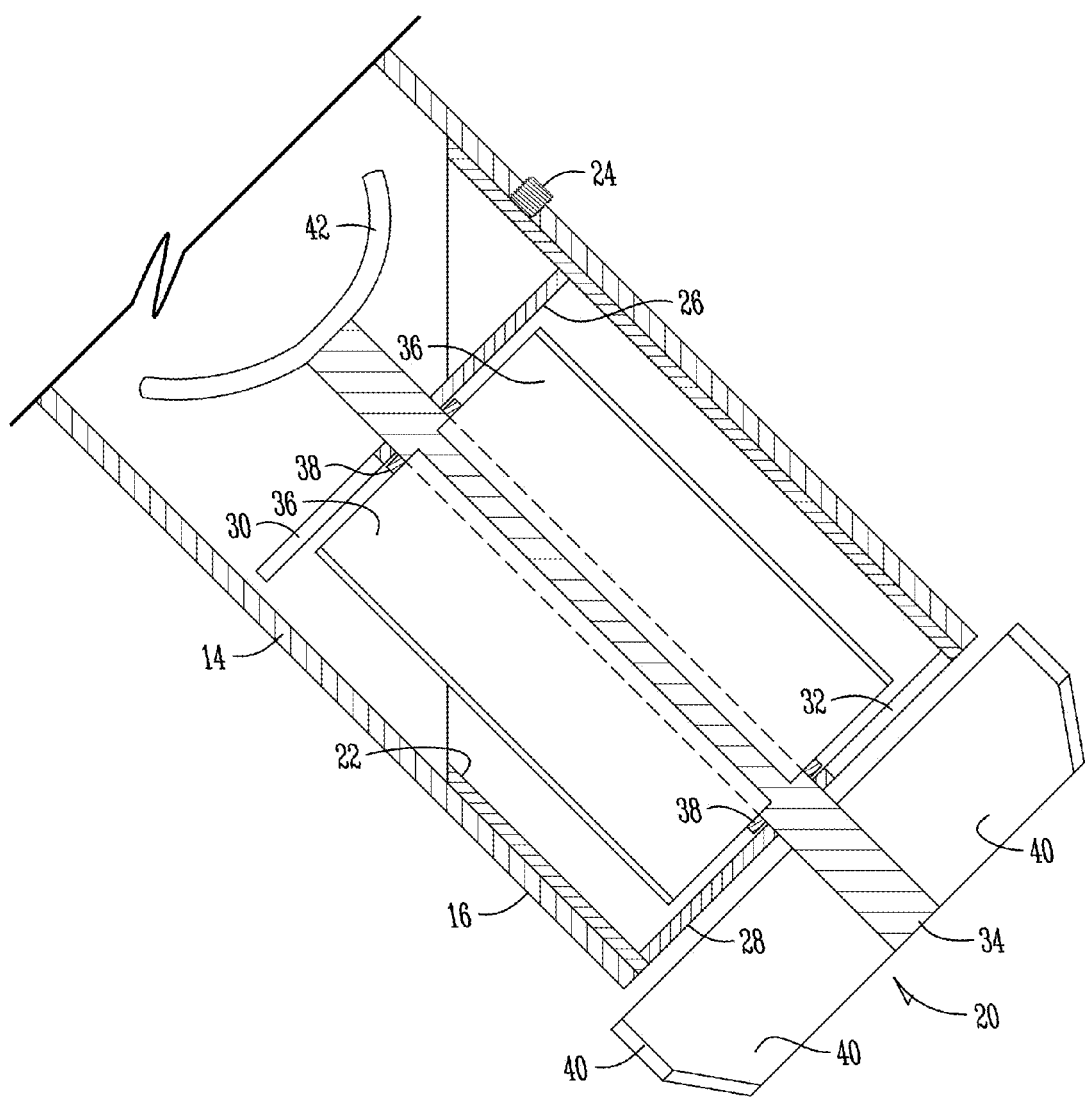
FIG. 4 is a sectional view of the plug taken along lines 4-4 of FIG. 3A.

The present invention is directed towards a device in the form of an insert or plug 20 which fits into the lower end 16 of the tube 14 so as to convert the tube 14 from a standard gravity drop system to a self-feeding or ad libitum system. More particularly, the plug 20 includes a cylindrical body or housing 22 which matingly fits inside the lower end 16 of the tube 14, as best seen in FIG. 4. The body 22 may be secured or fixed in the tube 14 by a set screw 24, a self-tapping screw, or any other convenient means. Preferably, the screw 24 does not extend through the body 22.

Figure 5:
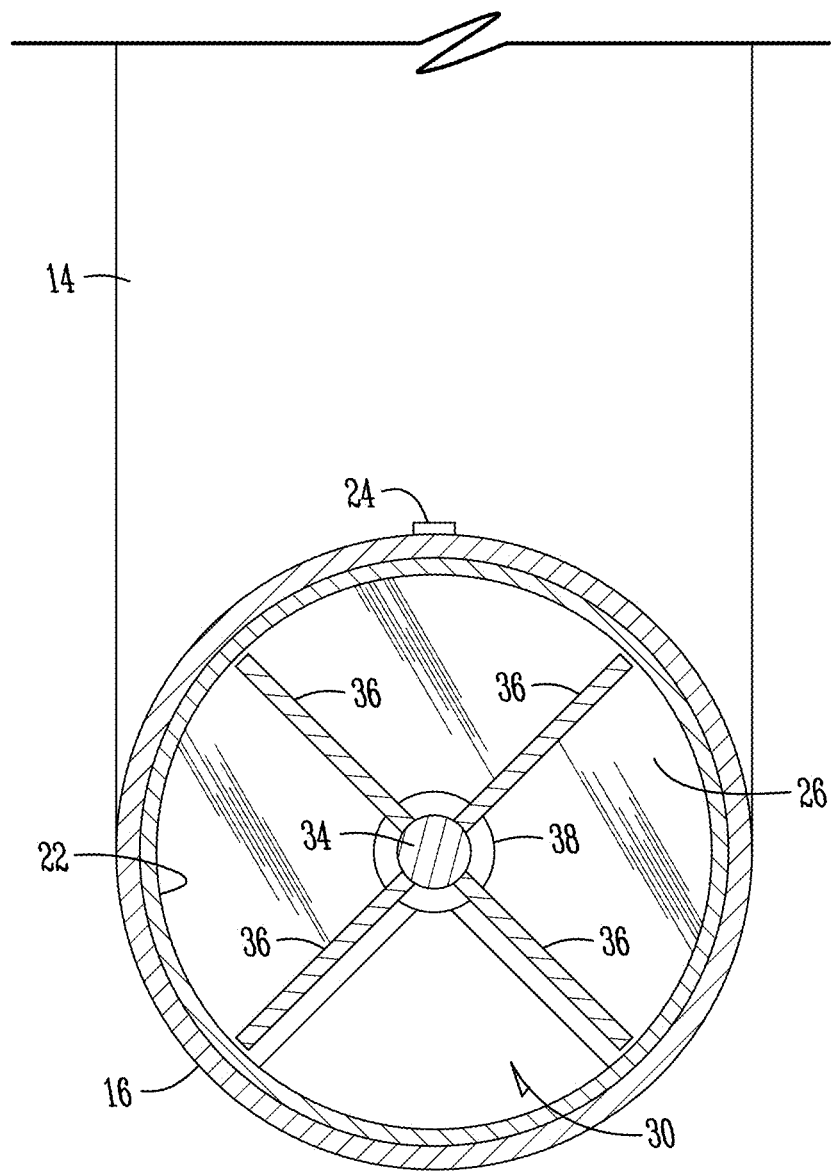
FIG. 5 is a sectional view of the plug taken along lines 5-5 of FIG. 2.

The body 22 includes an upper plate 26 and a lower plate 28 fixed at the opposite ends of the body. The upper plate has a feed inlet 30 preferably located on a lower portion of the plate, for example, at the 6 o'clock position. The lower plate 28 has a feed outlet 32 on an upper portion of the plate, for example, at the 12 o'clock position. Thus, the inlet 30 and outlet 32 are offset with respect to one another. The plates 26, 28 rotatably support an axle 34 extending through the plates. A plurality of fins 36 extends radially outwardly from the axle 34, and have outer edges in close proximity to the interior wall of the body 22, as best seen in FIG. 5. A washer 38 is mounted on the axle 34 adjacent the plates 26, 28, so as to space the upper and lower ends of the fins 36 from the plates 26, 28, as shown in FIG. 4.

A spinner or actuator comprising a plurality of spokes 40 extends radially outwardly from the lower end of the axle 34, outside of the body 22. Preferably, the outer ends of the spokes 40 extend beyond the perimeter of the body 22. While the drawings show four spokes 40, it is understood that the number and shape of spokes 40 may vary from that shown in the drawings.

A stirring device 42, such as a bar or finger, is fixed on the upper end of the axle 34 so as to rotate with the axle. The bar 42 resides upstream from the upper plate 26 so as to stir feed in the tube 14, and thereby prevent clogging or bridging of the feed within the tube 14. The stirring device 42 may be any shape, or size, or material to stir the feed in the tube 14, including a rigid or flexible member.

In use, when the plug 20 is installed in the tube 14, the plates 26, 28 effectively close the lower end of the tube 14, which is normally open in a conventional drop tube feeder. Thus, the plug 20 prevents feed from being discharged from the tube 14 until a gilt or sow in the stall 10 nudges the spokes 40 to rotate the axle 34. Such rotation of the axle 34 also rotates the attached fins 36, such that feed which has entered the body 22 of the plug 20 through the inlet 30 in the upper plate 26 is carried upwardly by the fins 36 along the inner wall of the body 22 for discharge through the feed outlet 32 in the lower plate 28. Since the tube 14 is angled downwardly, as seen in FIGS. 1 and 4, feed carried by the fins 36 to the outlet 32 will discharge by gravity over the spokes 40 and onto the floor of the stall 10 for consumption by the gilt or sow. Also, the depth of the spokes 40 carries the feed beyond the lower plate 28 so as to deposit the feed further from the lower end 16 of the tube 14, for easier access by the gilt or sow.

The structure of the various components of the device 20 can be modified without departing from the scope of the present invention. For example, as shown in FIG. 4, the upper end of the body 22 is shown to be cut at an angle of approximately 45° which facilitates assembly of the body 22 inside the tube 14. This angle can be more or less than that shown in the drawings, or can be eliminated. Also, the shape of the fins 36 may be modified, such as a curved, cup-like surface, or maybe an auger flighting to carry feed from the inlet 30 to the outlet 32.

The device 20 can be quickly and easily retrofit into the feed tube 14 for each stall 10 in a gestation barn. While the volume of the feed provided to the gilt or sow is controlled by the volume in the hopper 12, the gilt or sow controls the timing of the feed discharge by actuation of the spokes 40. Since the gilt or sow will actuate the self-feeder device 20 of the present invention when she is hungry, the animal will consume the discharged feed, substantially reducing or eliminating feed waste which occurs with a conventional drop feed system. Also, since there is no waste feed being washed out of the stall 10 by the cleaning system, clogging of drain troughs by waste feed is eliminated, thereby saving labor costs and time.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A self-feeding device for only one swine in gestation stall, comprising:
    a feed tube extending from a feed hopper, the tube having a lower end extending at a non-vertical angle into the stall to deposit feed from the hopper into the stall;
    a plug in the open end of the tube;
    a feed inlet in an upstream end of the plug to introduce feed from the tube into the plug;
    a feed outlet in a downstream end of the plug to discharge the feed from the plug into the gestation stall;
    and
    a rotatable member in the plug to carry the feed in the plug to the outlet for discharge into the stall only upon rotation of the member by the swine in the stall and for consumption only by the swine in the stall; wherein the rotatable member includes a central axle with fins extending radially outwardly from the axle, a stirring member upstream from the inlet to inhibit bridging of feed in the tube adjacent the inlet and a plurality of spokes adjacent the outlet, said plurality of spokes are adapted to be nudged by the swine's nose to rotate the member.

2. The device of claim 1 wherein the plug includes a cylindrical outer wall matingly fit within the tube.

3. The device of claim 1 wherein the plug has an upper wall having an opening to define the inlet, and a lower wall with an opening to define the outlet.

4. The device of claim 1 wherein the inlet is at a 6 o'clock position and the outlet is at a 12 o'clock position.

5. The device of claim 1 wherein the rotatable member rotates 360° relative to the plug.

6. The device of claim 1 wherein the plug has an axis oriented in a non-vertical position, with the inlet adjacent a 6 o'clock position and the outlet adjacent a 12 o'clock position.

7. A method of self-feeding only one swine, the method comprising:
   providing a feed tube extending from a feed hopper in a gestation stall, the tube having an open lower end extending at a non-vertical angle into the stall to deposit feed from the hopper into the stall;
   inserting a plug into the open lower end of the tube for fixed retention inside the tube and so as to close the lower end, the plug having a plurality of spokes rotatable by the swine in the stall to discharge feed in the plug through an outlet in the plug and into the stall for consumption only by the swine in the stall;
   providing a feed inlet in an upstream end of the plug to introduce feed from the tube into the plug;
   providing a feed outlet in a downstream end of the plug to discharge the feed from the plug into the gestation stall; and
   providing a rotatable member in the plug to carry the feed in the plug to the outlet for discharge into the stall only upon rotation of the member by the swine in the stall and for consumption only by the swine in the stall, wherein the rotatable member includes a central axle with fins extending radially outwardly from the axle, a stirring member upstream from the inlet to inhibit bridging of feed in the tube adjacent the inlet and a plurality of spokes adjacent the outlet, said plurality of spokes are adapted to be nudged by the swine's nose to rotate the member.

8. The retrofit method of claim 7 wherein the plurality of spokes are rotatable 360° relative to the plug.

9. The retrofit method of claim 7 wherein the plug has an inlet, and further comprising positioning the inlet at a 6 o'clock position and positioning the outlet at a 12 o'clock position.

\* \* \* \* \*